United States Patent [19]

Grego

[11] Patent Number: 4,636,032
[45] Date of Patent: Jan. 13, 1987

[54] OPTICAL FIBRE CONNECTOR

[75] Inventor: Giorgio Grego, Venaria, Italy

[73] Assignee: CSELT Centro Studi e Laboratori Telecomunicazioni S.p.A., Turin, Italy

[21] Appl. No.: 669,628

[22] Filed: Nov. 8, 1984

[30] Foreign Application Priority Data

Nov. 10, 1983 [IT] Italy .............................. 68173 A/83

[51] Int. Cl.⁴ .......................... G02B 6/36; G02B 7/26
[52] U.S. Cl. ............................. 350/96.20; 350/96.21
[58] Field of Search ............... 350/96.20, 96.21, 96.22; 335/219

[56] References Cited

U.S. PATENT DOCUMENTS

| | | | |
|---|---|---|---|
| 3,870,395 | 3/1975 | Schicketanz | 350/96.21 |
| 4,062,620 | 12/1977 | Pirolli | 350/96 C |
| 4,448,483 | 5/1984 | Ryley | 350/96.21 |

FOREIGN PATENT DOCUMENTS

| | | | |
|---|---|---|---|
| 2645991 | 4/1978 | Fed. Rep. of Germany | 350/96.21 |
| 2020055 | 11/1979 | United Kingdom | |

Primary Examiner—William L. Sikes
Assistant Examiner—Robert E. Wise
Attorney, Agent, or Firm—Karl F. Ross; Herbert Dubno

[57] ABSTRACT

The connector ensures the alignment between the two fibres ends (9, 10) thanks to the force exerted by a locally generated magnetic field (5, 6, 7, 8) on a ferromagnetic fluid placed between the side fibre surface and a small tube (1) with a diameter greater than fibre diameter.

3 Claims, 1 Drawing Figure

U.S. Patent   Jan. 13, 1987   4,636,032
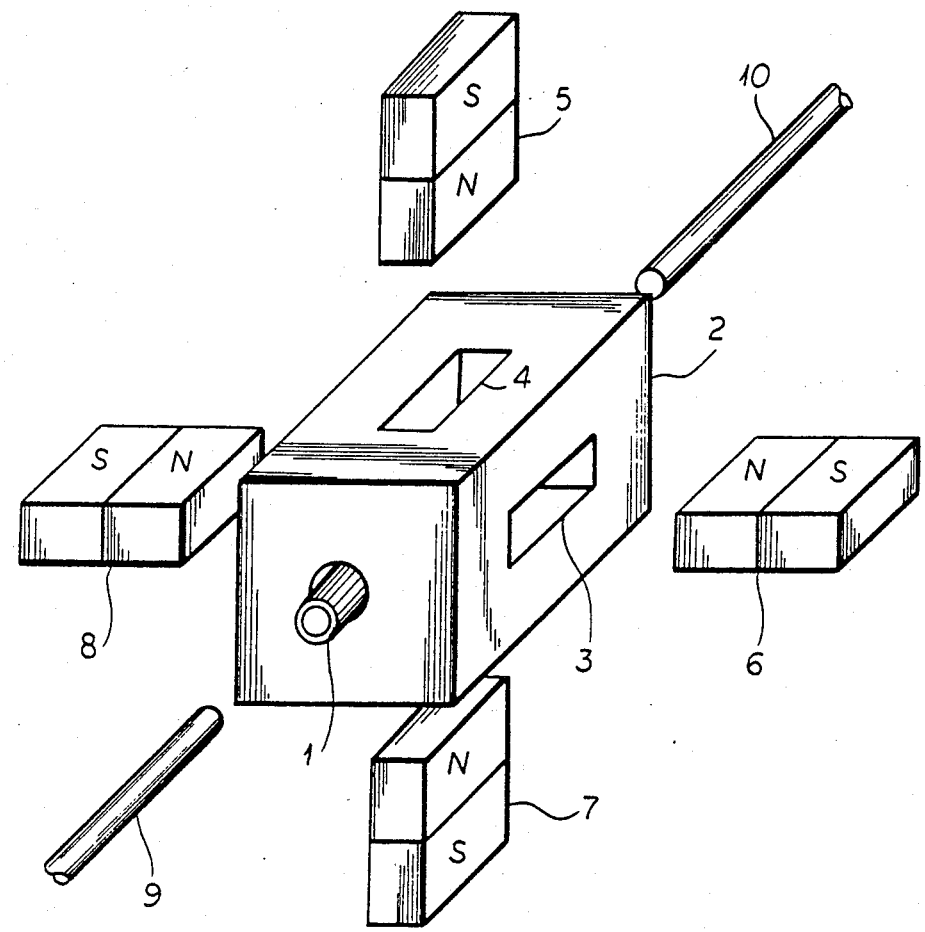

OPTICAL FIBRE CONNECTOR

DESCRIPTION

The present invention relates to physical carriers for telecommunications systems using light radiations and more particularly it concerns an optical fibre connector.

As known, one of the main problems to be solved when using optical fibres in transmission systems is that of making good connections between fibre trunks, so as to reduce the coupling losses to a minimum.

Such losses arise from the displacement, separation and misalignment errors of the two fibre ends to be connected, (i.e. lack of parallelism and lateral axis displacement), as well as from refractive index discontinuity near the connection.

The alignment of the two fibre ends is generally obtained by sleeve or v-groove guides, where the fibres are held in position by means of adhesives or elastic elements, and refractive-index matching is obtained by interposing suitable liquids between the two fibre-ends.

Such sleeve or V guides are suitable for permanent splices, but are ill-suited for connectors, as their structure fragility does not allow repeated connections and disconnections a connector is generally to undergo.

Optical fibre connectors exploiting the forces exerted on the fibre ends by a magnetic field are also known.

Such devices, described by instance in U.K. Pat. No. 2020055, in the name of the same Applicant, or in U.S. Pat. No. 4062620 in the name of Telecommunications Radioélectriques et Téléphoniques T.R.T., can operate only if the fibre ends are suitably prepared, e.g. by inserting them into small capillary tubes made of ferromagnetic material or by depositing on them by means of an electrochemical process a layer of material of the same nature. Yet, these operations prove particularly difficult owing to reduced fibre size and chiefly when the fibre has already been installed in an underground duct.

These disadvantages are overcome by the optical-fibre connector provided by the present invention, which allows optical fibres to be connected without end preparation ensuring their perfect alignment without mechanical elements with particular accuracy or adjusting requirements.

Alignment is obtained by exploiting the special properties of the so-called ferromagnetic fluids. These fluids are colloids where very small ferromagnetic particles are suspended in a carrier liquid. The suspension is stable, even though particle density is higher than liquid density, because the particle continuously strikes the carrier-liquid molecules in random thermal agitation. If the thermal energy is equal or or higher than the gravitational energy necessary to raise the particles to the height they have in the vessel containing the fluid and if the particle dimensions do not exceed a few nanometers the suspension is stable. The aggregation between the particles, due to magnetic and van der Waals forces is avoided to coating each particle with a molecular film of a surfactant, which acts as an elastic surface.

The application of a magnetic field to a ferromagnetic fluid originates a volume force. A force proportional to the product of the absolute value of the magnetic momentum and the space gradient of the modulo of the magnetic field acts on each magnetic particle. More particularly, in a ferromagnetic fluid at rest the sum of the energy due to hydrostatic pressure and the magnetic energy is constant.

The present invention provides a connector for optical fibres, in which fibre end alignment is obtained by the effect of a magnetic field and refractive index matching is accomplished by means of a matching liquid, characterized in that it is composed of a small tube of non-ferromagnetic material, with a diameter exceeding that of the fibres, into which the fibre ends are inserted together with a ferromagnetic fluid, after covering the end faces with said index-matching liquid, as well as of elements apt to generate a magnetic field with an intensity minimum in correspondence with said small-tube axis and intensity increasing in radial direction.

The foregoing and other characteristics of the present invention will be made clearer by the following description of a preferred embodiment thereof, given by way of example and not in a limiting sense, and by the annexed drawing which shows an exploded view of the optical-fibre connector provided by the invention.

Reference 1 denotes a small tube made of non-ferromagnetic material, e.g. glass, with the inner diameter greater than the external diameter of optical fibres. The small tube is housed in a cylindrical hole made in block of non-ferromagnetic material 2, forming the connector body.

Four cavities are made in the block in symmetrical positions around the hole (3 and 4 are shown in the drawing) to contain four magnetic rods 5, 6, 7 and 8, generating the same field intensity. Said rods are held in contact with the small tube 1, with the north poles towards the inside and south poles towards the outside or vice versa. In this way an axial zone, whose magnetic-field intensity is minimum, is obtained inside the small tube.

Fibre ends 9 and 10 are then inserted into the small tube till they contact, after pouring a few drops of refractive-index matching liquid on the end faces.

A small quantity of ferromagnetic fluid is then injected, e.g. with a syringe, inside the small tube. This fluid flows towards the middle zone, where the magnetic field is stronger. Meanwhile hydrostatic fluid pressure inside the fluid becomes such as to maintain the sum of pressure and magnetic field energies constant. An axial region is thus obtained coincident with that where magnetic-field energy is maximum (minimum intensity) where hydrostatic pressure is minimum.

The optical fibres and the index-matching liquid are consequently carried into the axial region where the pressure is minimum, and in a perfect alignment position. To obtain maximum light-energy transfer the liquid interposed between the fibres ends ought not to be miscible with the magnetic fluid. This is obtained because opaque ferromagnetic particles, which have been removed from the small cylinder axis as a ferromagnetic field effect, cannot interpose between the end faces of the fibres.

Supposing that fibre ends to be connected have about 30 mm length inside the small tube, their weight would be about 0.8 mg. The buoyant force due to fluid contributes to sustain the ends for about a third of their weight, that is why about only 0.5 mg of the fibre weight is to be counterbalanced by the fluid force due to electromagnetic field.

In the technical literature ferromagnetic fluids held in place by permanent magnets are used to seal ambients with a pressure difference of about 0.2 atm, i.e. 2 g/mm².

In case of a fibre having a diameter of 120 μm, inserted for 30 mm into the small tube, the surface on which the magnetic force is exerted is about 3.6 mm, and hence the force is 2·3·6=7.2 g, considerably higher than the value of 0.5 mg necessary to raise the fibre.

It is clear that what described has been given only by way an on limiting example.

Variations and modifications to the above embodiments may of course by made without departing from the scope of the invention.

For example, the magnetic field could be generated by electromagnets and not by permanent magnets. In addition, the connector shown in the drawing can be housed in a container equipped at the ends with suitable devices (e.g. a gland) apt to fix and protect the optical fibre end, which is ordinarily inserted into an optical cable.

I claim:

1. A connector for optical fibres, in which fibres end alignment is obtained by the effect of a magnetic field and refractive index matching is accomplished by means of a matching liquid, characterized in that it is composed of a small tube of nonferromagnetic material, with a diameter exceeding that of the fibres, into which the fibre ends are inserted together with a ferromagnetic fluid after covering the end faces with said index-matching liquid, as well as of elements apt to generate a magnetic field with an intensity minimum in correspondence with said small-tube axis and intensity increasing in radial direction.

2. Connector as claimed in claim 1, wherein said magnetic field is obtained by permanent magnets symmetrically arranged around said small tube, so as to present towards the tube axis the same magnetic polarity.

3. Connector as claimed in claim 1, wherein said magnetic field is generated by electromagnets.

* * * * *